(12) United States Patent
Fukuda

(10) Patent No.: US 6,212,037 B1
(45) Date of Patent: *Apr. 3, 2001

(54) DISK CARTRIDGES

(75) Inventor: Taizo Fukuda, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,121

(22) Filed: Apr. 27, 1998

(30) Foreign Application Priority Data

Apr. 28, 1997 (JP) .................................... 9-109970

(51) Int. Cl.$^7$ .................................... G11B 23/03
(52) U.S. Cl. .................................... 360/133
(58) Field of Search .................... 360/2, 133, 137; 369/271, 272, 282, 290, 291; 428/64

(56) References Cited

U.S. PATENT DOCUMENTS

| | | | |
|---|---|---|---|
| 3,882,701 | * 5/1975 | Wirth | 70/63 |
| 4,106,066 | * 8/1978 | Kudo | 360/133 |
| 4,378,576 | * 3/1983 | Roling | 360/137 |
| 4,394,700 | * 7/1983 | Edwards | 360/133 |
| 4,459,628 | * 7/1984 | Barton | 360/133 |
| 4,525,758 | * 6/1985 | Nakagawa et al. | 360/133 |
| 4,622,618 | * 11/1986 | Oishi | 360/133 |
| 4,739,434 | * 4/1988 | Iizuka et al. | 360/133 |
| 4,743,993 | * 5/1988 | Ommori et al. | 360/133 |
| 5,793,742 | * 8/1998 | Sandell et al. | 369/291 |
| 5,867,477 | * 2/1999 | Naito et al. | 369/290 |
| 5,883,880 | * 3/1999 | McCarty | 369/290 |

* cited by examiner

Primary Examiner—David L. Ometz
Assistant Examiner—Angel Castro
(74) Attorney, Agent, or Firm—Limbach & Limbach L.L.P.

(57) ABSTRACT

A disk cartridge includes a shell, a disklike recording medium rotatably accommodated in the shell, and a center core mounted to the disklike recording medium in the center thereof. The center core includes an upper-clearance defining portion which abuts on the upper inner surface of the shell to define an upper clearance between the upper inner surface of the shell and the upper side of the disklike recording medium, and a lower-clearance defining portion which abuts on the lower inner surface of the shell to define a lower clearance between the lower inner surface of the shell and the lower side of the disklike recording medium.

4 Claims, 4 Drawing Sheets

DISK CARTRIDGES

BACKGROUND OF THE INVENTION

The present invention relates generally to cartridges for disks such as a microfloppy disk, and particularly, to the cartridges for disks which need high-speed rotation due to increased storage capacity.

Referring to FIG. 5, a known disk cartridge 101 comprises a disklike recording medium 102, a center core 103 mounted in the center thereof and made of magnetic metal, a shell 104 for rotatably accommodating the disklike recording medium 102 with the center core 103 located in an opening 104a, a pair of liners 105, 106 placed on the upper and lower inner surfaces of the shell 104, and a lifter 107/liner pressing ribs 108 for lightly pressing the liners 105, 106 to the upper and lower sides of the disklike recording medium 102.

When loading the disk cartridge 101 into a drive, a bottom plate 103a of the center core 103 is attracted on a disk table 201 of the drive by a magnet 202. And a spindle 203 of the drive enters a center hole 103b formed in the center of the bottom plate 103a of the center core 103, obtaining centering so called. The spindle 203 rotates with the disk table 201 to carry out recording/reproducing by a magnetic head of the drive which enters the shell 104 through a recording/reproducing opening, not shown, formed therein. The liners 105, 106 contact the upper and lower sides of the disklike recording medium 102 to remove dust, etc. and produce appropriate disk slide torque.

With recent development of multimedia, image and voice data are diversified, which needs increased storage capacity of microfloppy disks, resulting in requirements for high density and high-speed rotation thereof.

With the known disk cartridge 101, when rotating the disklike recording medium 102 at a speed several to several tens times as high as a conventional speed, the liners 105, 106 accelerate wear of a signal record surface of the disklike recording medium 102, deteriorating the durability thereof. Moreover, even if the liners 105, 106 are positioned so as not to directly contact the upper and lower sides of the disklike recording medium 102 upon high-speed rotation thereof, they disturb air flow or laminar flow produced on the surface of the disklike recording medium 102 by high-speed rotation, which forms turbulent flow to cause swinging of the signal record surface of the disklike recording medium 102, resulting in lowered recording/reproducing accuracy.

Referring to FIG. 6, the disk cartridge 101 with no liner is proposed to solve such inconvenience. In the operating state where the disk cartridge 101 is chucked on the disk table 201 of the drive, the upper and lower sides 102a, 102b of the disklike recording medium 102 are in non-contact with the upper and lower inner surfaces 104a, 104b of the shell 104, producing no problem. However, in the non-operating state or upon keeping and transport, the lower side 102b of the disklike recording medium 102 contacts the lower inner surface 104b of the shell 104 as shown in FIG. 7, or the upper side 102a of the disklike recording medium 102 contacts the upper inner surface 104a of the shell 14 as shown in FIG. 8 when the disk cartridge 101 is placed upside down, suffering damage easily. Note that in the latter case as shown in FIG. 8, a slight clearance δ is defined between the upper side of the disklike recording medium 102 and the shell 105 by a flange 103c of the center core 103, which cannot fully prevent contact between the two, however.

If the upper and lower inner surfaces 104a, 104b of the shell 104 have a flash or a mark of an ejector pin for ejecting a molding from a mold, which are formed upon plastic molding, such flash or mark may injure the upper or lower side of the disklike recording medium 102.

It is, therefore, an object of the present invention to provide disk cartridges which are free of the above inconvenience, and contribute to improvement in the durability of the disklike recording medium.

SUMMARY OF THE INVENTION

An aspect of the present invention lies in providing a disk cartridge, comprising:

a shell with first and second inner surfaces;

a disklike recording medium rotatably accommodated in said shell, said disklike recording medium including first and second sides; and a center core mounted to said disklike recording medium in a center thereof, said center core including first and second portions, said first portion abutting on said first inner surface of said shell to define a first clearance between said first inner surface of said shell and said first side of said disklike recording medium, said second portion abutting on said second inner surface of said shell to define a second clearance between said second inner surface of said shell and said second side of said disklike recording medium.

DETAILED DESCRIPTION OF THE INVENTION

Figure 1:
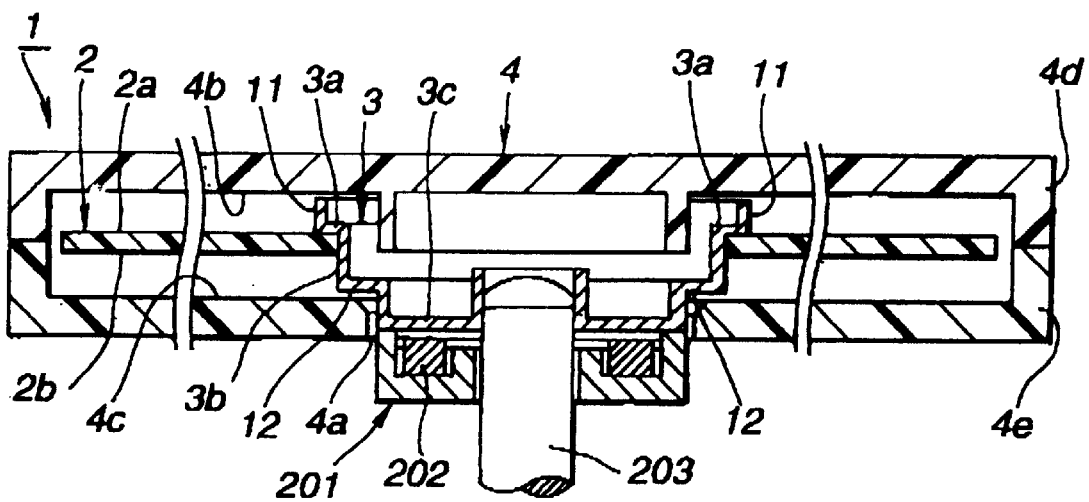
FIG. 1 is a sectional view showing an embodiment of a disk cartridge in the operating state.

Referring to FIG. 1, a disk cartridge 1 comprises a disklike recording medium 2, a center core 3 mounted in the center thereof and made of magnetic metal, and a shell 4 for rotatably accommodating the disklike recording medium 2 with the center core 3 located in an opening 4a.

The center core 3 includes an upper-clearance defining portion 11 which abuts on an upper inner surface 4b of the shell 4 to define a clearance between the upper inner surface 4b of the shell 4 and an upper side 2a of the disklike recording medium 2 for preventing contact between the two, and a lower-clearance defining portion 12 which abuts on a lower inner surface 4c of the shell 4 to define a clearance between a lower side 2b of the disklike recording medium 2 for preventing contact between the two.

The upper-clearance defining portion 11 is obtained by bending substantially perpendicularly upwardly the outer peripheral end of a flange 3a of the center core 3, having the shape of a cylinder.

The lower-clearance defining portion 12 is obtained by reducing the diameter of a lower portion of a bottomed cylinder 3b connected to the inner peripheral end of the flange 3a.

When the disk cartridge 1 is loaded into a drive to chuck a bottom 3a of the center core 3 on a drive table 201 by a magnet 202, etc. as shown in FIG. 1, the upper- and lower-clearance defining portions 11, 12 are in non-contact with the upper and lower inner surfaces 4b, 4c of the shell 4 to allow rotation of the disklike recording medium 2 for recording/reproducing.

The shell 4 comprises an upper half 4d with the opening 4a and a lower half 4e, which are connected to each other to form a flat casing. The lower half 4c is formed with the opening 4a in the center thereof, and a recording/reproducing opening, not shown, formed to face portions of the upper and lower halves 4d, 4e displaced from the center thereof. The recording/reproducing opening is closed by a shutter, not shown, slidably mounted to the shell 4.

Figure 2:
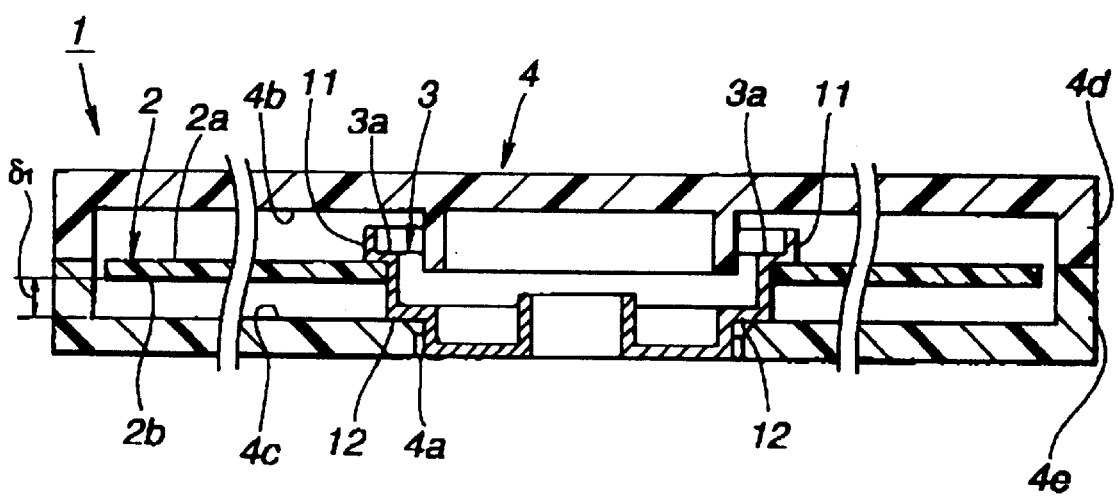
FIG. 2 is a view similar to FIG. 1, showing the disk cartridge in the non-operating state.

Next, the operation of the upper- and lower-clearance defining portions 11, 12 will be described. Referring to FIG. 2, in the non-operating state of the disk cartridge 1, the lower-clearance defining portion 12 abuts on the lower inner surface 4c of the shell 4 to define a clearance $\delta_1$ between the lower inner surface 4c of the shell 4 and the lower side 2b of the disklike recording medium 2 for preventing contact between the two. This prevents damage to the lower side 2b of the disklike recording medium 2 even if the lower inner surface 4c of the shell 4 has a flash or an ejector-pin mark.

Figure 3:
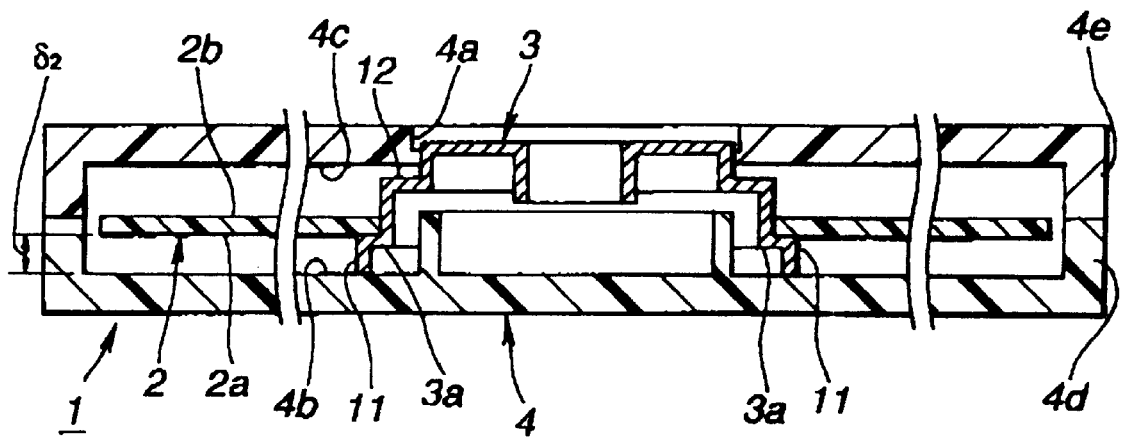
FIG. 3 is a view similar to FIG. 2, showing the disk cartridge in the non-operating state.

On the other hand, referring to FIG. 3, in the non-operating state of the disk cartridge 1, when it is placed upside down, the upper-clearance defining portion 11 abuts on the upper inner surface 4b of the shell 4 to define a clearance $\delta_2$ between the upper inner surface 4b of the shell 4 and the upper side 2a of the disklike recording medium 2 for preventing contact between the two. This prevents damage to the upper side 2a of the disklike recording medium 2.

Figure 4:
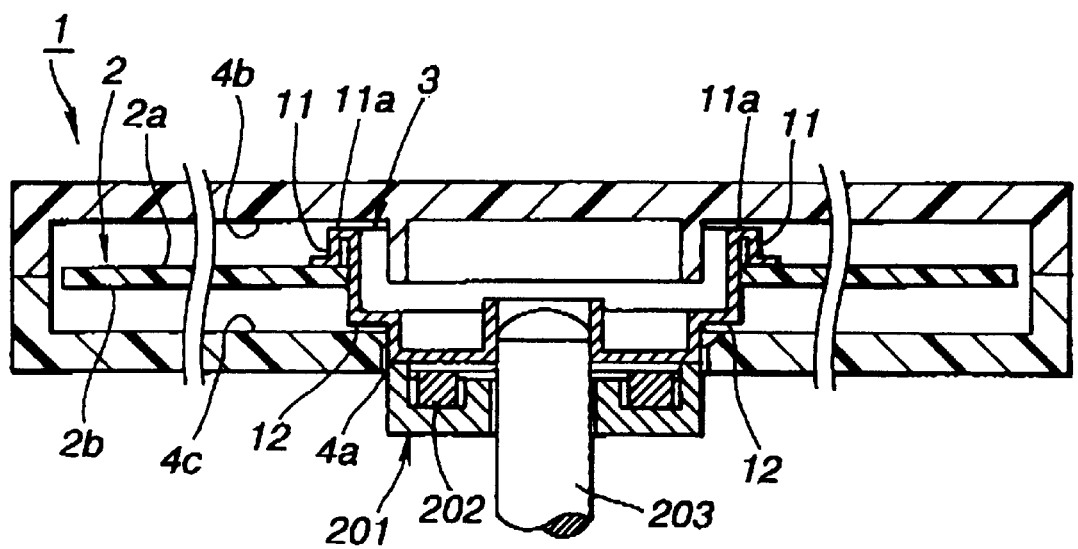
FIG. 4 is a view similar to FIG. 3, showing a variant of the disk cartridge.
Figure 5:
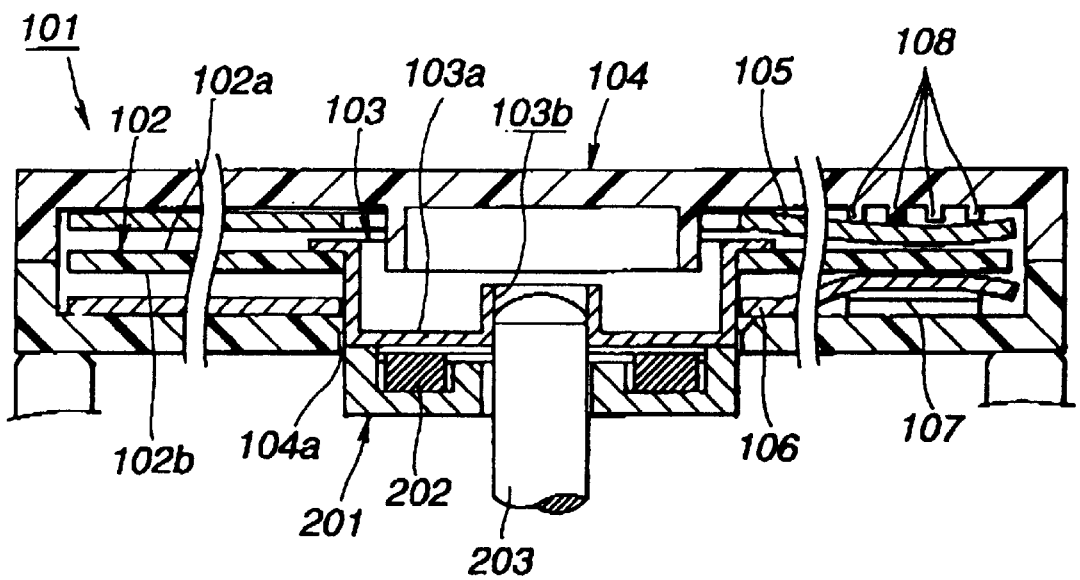
FIG. 5 is a view similar to FIG. 4, showing a known disk cartridge in the operating state.
Figure 6:
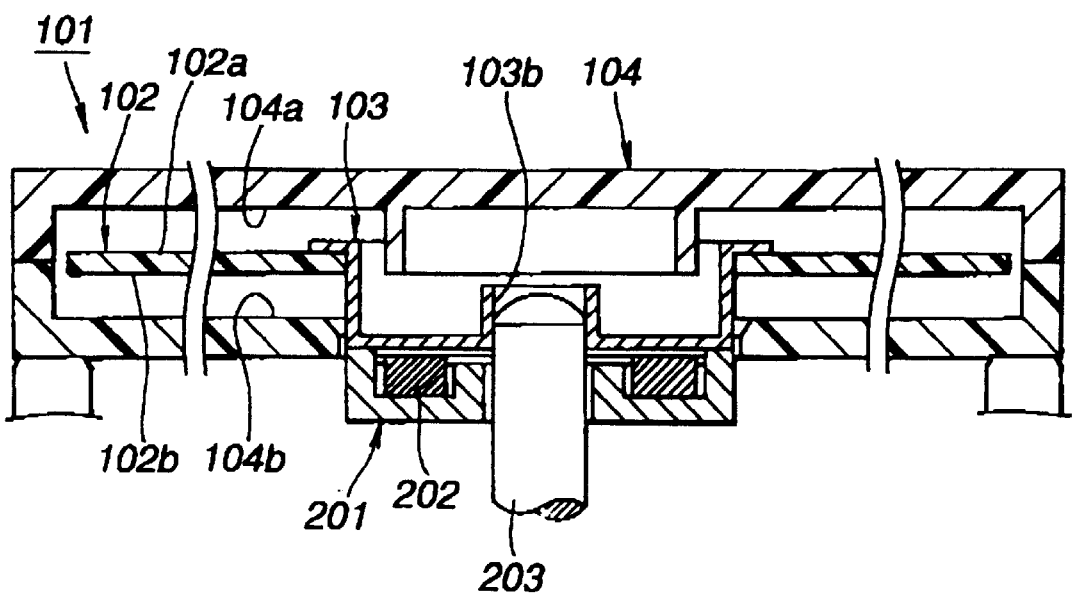
FIG. 6 is a view similar to FIG. 5, showing another known disk cartridge in the operating state.
Figure 7:
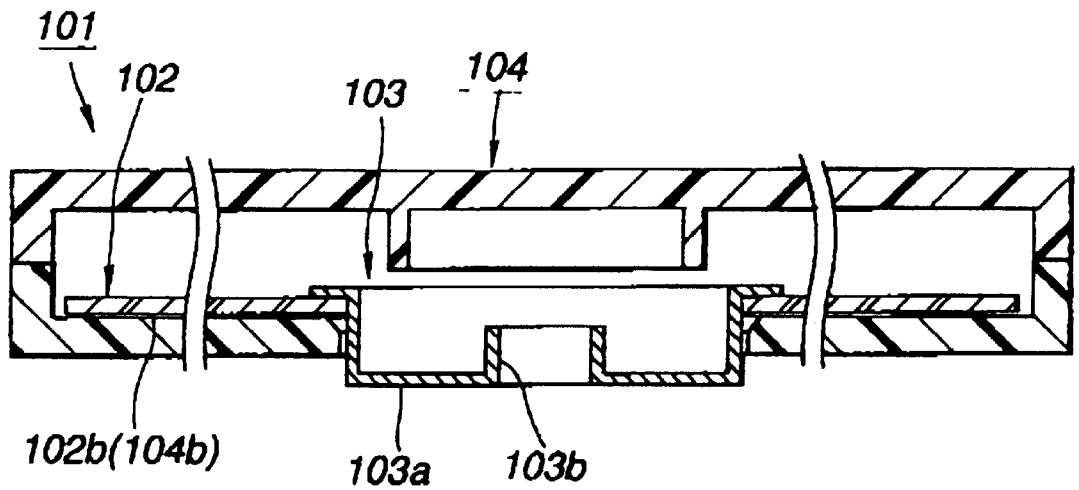
FIG. 7 is a view similar to FIG. 6, explaining an inconvenience of another known disk cartridge.
Figure 8:
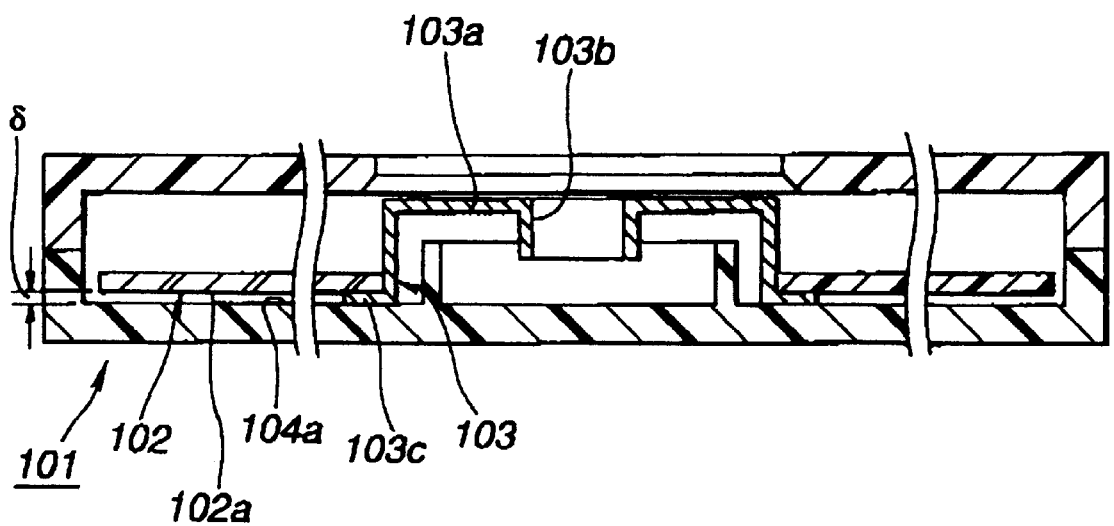
FIG. 8 is a view similar to FIG. 7, explaining an inconvenience of another known disk cartridge

FIG. 4 shows a variant of the above embodiment which is substantially the same as the embodiment except the upper-clearance defining portion 11. Specifically, in this variant, the upper-clearance defining portion 11 is obtained by bending outwardly the inner periphery of the flange 3a to form an inverted U, having the shape of a double cylinder. An upper fold 11a of the double cylinder abuts on the upper inner surface 4b of the shell 4 to prevent an end of the upper-clearance defining portion 11 from damaging the upper inner surface 4b of the shell 4.

Having described the present invention with regard to the preferred embodiment, it is noted that the present invention is not limited thereto, and various changes and modifications can be made without departing from the scope of the present invention.

What is claimed is:

1. A linerless disk cartridge, comprising:
    a shell with first and second inner surfaces;
    a disklike recording medium rotatably accommodated in said shell, said disklike recording medium including first and second sides; and
    a center core mounted to said disklike recording medium in a center thereof, said center core including first and second portions, said first portion for abutting on said first inner surface of said shell to define a first clearance between said first inner surface of said shell and said first side of said disklike recording medium for preventing contact therebetween, said second portion for abutting on said second inner surface of said shell to define a second clearance between said second inner surface of said shell and said second side of said disklike recording medium for preventing contact therebetween, the center core being a one piece integral structure.

2. The disk cartridge of claim 1, wherein said first portion of said center core is obtained by bending substantially perpendicularly upwardly an outer peripheral end of said center core.

3. The disk cartridge of claim 1, wherein said second portion of said center core is obtained by reducing a diameter of a lower portion of said center core.

4. The disk cartridge of claim 1, wherein said first portion of said center core is obtained by bending outwardly an inner periphery of said center core.

* * * * *